Nov. 21, 1939.   C. HORANSKY ET AL   2,180,828
BEER RETURN DEVICE
Filed Aug. 19, 1938   2 Sheets-Sheet 1
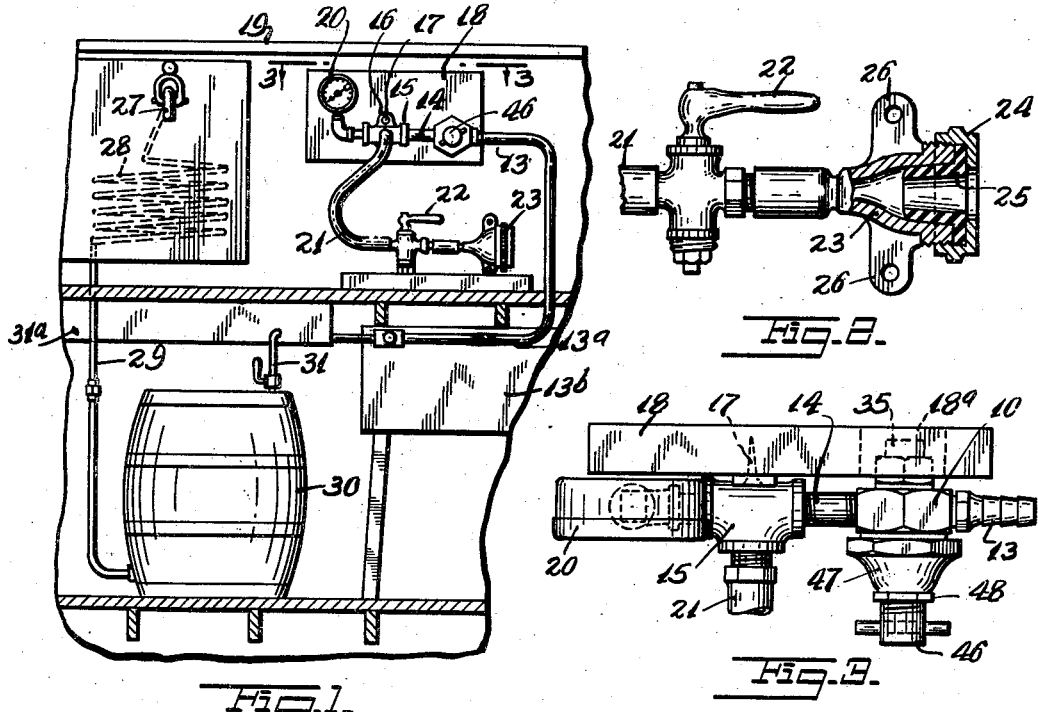
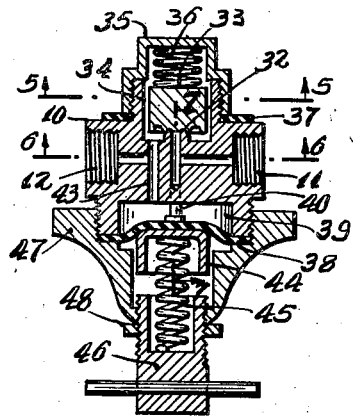
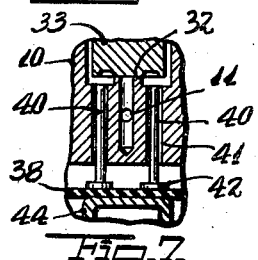
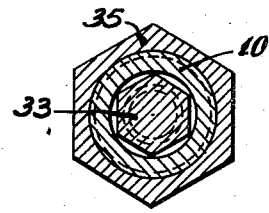
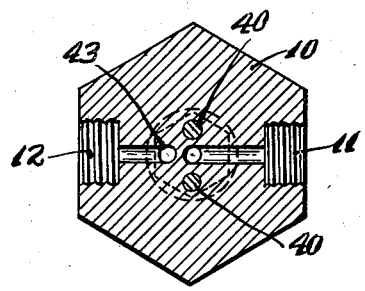
INVENTORS
Charles Horansky
Frank J. Suchanek
BY
ATTORNEY Nov. 21, 1939.  C. HORANSKY ET AL  2,180,828
BEER RETURN DEVICE
Filed Aug. 19, 1938   2 Sheets-Sheet 2

INVENTORS
Charles Horansky
Frank J. Suchanek
BY
ATTORNEY

Patented Nov. 21, 1939

2,180,828

UNITED STATES PATENT OFFICE 2,180,828

BEER RETURN DEVICE

Charles Horansky and Frank J. Suchanek, New York, N. Y.

Application August 19, 1938, Serial No. 225,738

3 Claims. (Cl. 137—153)

This invention relates to new and useful improvements in a beer return device.

The invention has for an object the construction of a device as mentioned which is adapted to be connected with a beer faucet to efficiently return the beer from the cooling coils back into the beer barrel.

More specifically, the device is characterized by a body having an air inlet at one side for connection with a source of compressed air, and an air outlet at another side for connection with a beer faucet, and an arrangement for controlling the compressed air as desired.

More specifically, the invention proposes the arrangement of a valve seat for the air inlet, positioned to the front of the air outlet, a spring loaded valve on the seat, and a novel mechanism to counteract the load on the spring-loaded valve to a predetermined degree.

Another object of the invention resides in providing a quick release mechanism for the counteracting mechanism controlled by a bleed from the air outlet.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is an elevational view of a beer return device constructed according to this invention and shown in the vicinity of a beer supply and faucet.

Fig. 2 is an enlarged fragmentary elevational view of the extreme end of the apparatus by which the beer return device is attached to the beer faucet, a portion of this figure being broken away to disclose interior parts.

Fig. 3 is an enlarged elevational view looking in the direction of the line 3—3 of Fig. 1.

Fig. 4 is a horizontal sectional view of the control mechanism shown in Fig. 3.

Fig. 5 is a transverse sectional view taken on the line 5—5 of Fig. 4.

Fig. 6 is a transverse sectional view taken on the line 6—6 of Fig. 4.

Fig. 7 is a fragmentary enlarged sectional view taken on the line 7—7 of Fig. 4.

Figure 8:
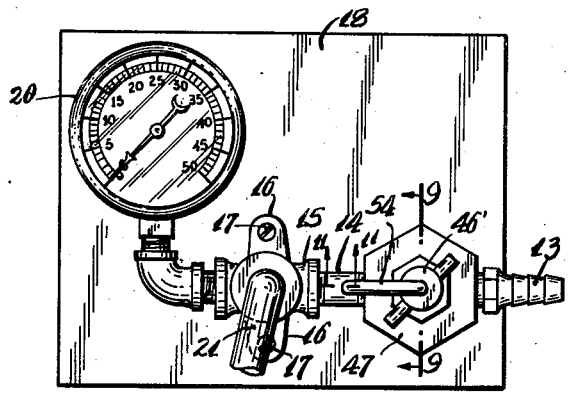
Fig. 8 is an elevational view of a beer return device constructed according to a modification of this invention.

The beer return device, according to this invention, includes a body 10 having an inlet 11 at one side for connection with a source of compressed air and an outlet 12 at another side for connection with a beer faucet. A pipe connector 13 (see Figs. 1 and 3) is engaged in the air inlet 11. This pipe connector is adapted to receive a hose 13$^a$ from a compressed air supply 13$^b$. A pipe 14 (see Figs. 1 and 3) is engaged into the air outlet 12. This pipe 14 connects with a T-connection 15 which has lugs 16 engaged by screws 17 by which it is secured to a panel 18. This panel is mounted upon a counter bar 19 of a beer establishment.

A pressure gauge 20 is connected with one of the arms of the T-connection 15. The other arm of the T-connection is provided with a hose 21. This hose terminates in an air cock 22 connected with a faucet adapter 23. The faucet adapter includes a hollow body upon the outer end of which a ring 24 is threadedly engaged. A rubber adapter 25 is disposed within the hollow body and clamped down by the ring 24.

The body 23 is provided with several lugs 26 by which it may be manually grasped. This adapter may be forced upon a beer faucet, such as the faucet 27. The beer faucet is connected with a cooling coil 28 in turn connected with a pipe 29, which in turn connects with the beer barrel 30. The beer barrel is provided with the conventional air pressure hose 31 for a supply of compressed air from storage tank 31$^a$ to provide the necessary pressure to cause the beer to come up through the pipe 29 and out of the faucet. The purpose of the beer return device is to force all the beer back into the beer barrel. This is necessary at certain times, as when it is desired to return the beer left in the cooling coil at night, into the barrel, to save the same, or to clean the system, etc.

The body 10 is formed with a valve seat 32 for the air inlet 11 which is positioned to the front of the air outlet 12. A spring loaded valve 33 is cooperative with the valve seat 32. This valve 33 is slidably mounted within a cylindrical cavity 34 formed in one end of the body 10. A cap 35 is threadedly engaged on a portion of the body 10 and extends across the valve 33. A spring 36 is interposed between the cap 35 and the valve 33 for urging the valve upon its seat. A washer 37 is interposed between the cap 35 and the body 10 for producing a hermetic seal.

A diaphragm 38 is mounted within the body 10 and particularly within a cavity 39 formed in the body. Several pins 40 are slidably mounted through small passages 41 formed in the body 10 and bear against the front side of the valve 33 (see particularly Fig. 7). These pins are adapted to open the valve when moved inwards. Each of the pins 40 is provided with a head 42 which bears against the diaphragm 38. The body 10 is formed with a passage 43 extending from the air outlet 12 to the cavity 39; that is, to the pin side of the diaphragm.

An adjustable spring loaded mechanism is provided for the other side of the diaphragm 38. This mechanism includes a cup shaped member 44 resting against the diaphragm and slidably mounted and forming a support for an expansion spring 45. This expansion spring engages against a stem 46 which is threadedly engaged upon a nut element 47 which in turn is threadedly mounted on the body 10. A lock nut 48 threadedly engages the stem 46 and abuts against the nut element 47 for holding the stem 46 in various adjusted positions.

The operation of the device is as follows:

The spring 36 urges the valve 33 closed under a constant pressure. The compressed air from the air inlet 11 is restrained by the valve 33. The tension of the spring 36 may be counteracted by the action of the spring 45. The action of the latter spring may be controlled by the stem 46. The stem 46 may be screwed inwards or screwed outwards and locked in any adjusted position. This will result in changing the tension of the spring 45 which is communicated indirectly to the valve 33, via the pins 40. A change of tension on the spring 45 will result in counter-balancing the spring 36 to any desired degree. For example, the spring 36 normally may require 50 pounds of air pressure before the valve opens. By a proper control of the spring 45 this may be cut down to 40 pounds of pressure, or 30 pounds, as required.

It is possible to obtain the proper air pressure for causing the return of beer from the faucet 27, back to the barrel 30. It should be borne in mind that the barrel 30 contains an air pressure and therefore it is required that a higher air pressure be provided to cause the return of the beer. At the same time this pressure must not be too high since it will act back through the pipe 31 and against the pressure in this pipe, which is objectionable. The construction permits a proper selection of pressure.

The panel 18 is formed with an opening 18ª into which the cap 35 projects. Thus the cap 35 is protected against being tampered with, as it is required that it be tight at all times.

The flow of air through the device may be traced from the air inlet 11 to the valve seat 32, and if the valve 33 is opened, through the passage 43 and out from the air outlet 12.

Figure 10:
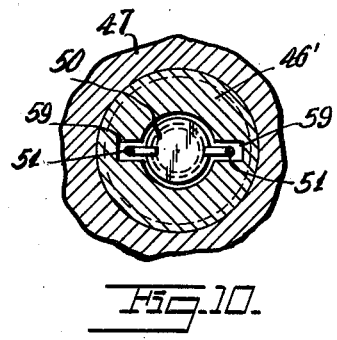
Fig. 10 is a transverse sectional view taken on the line 10—10 of Fig. 9.
Figure 9:
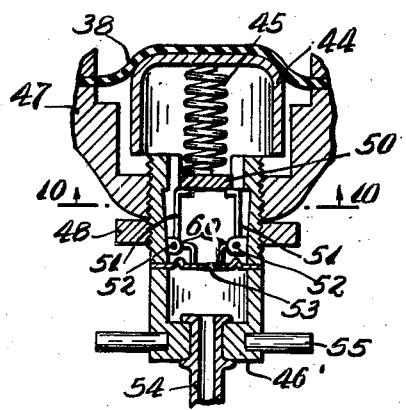
Fig. 9 is a sectional view taken on the line 9—9 of Fig. 8.
Figure 11:
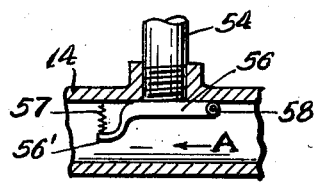
Fig. 11 is a fragmentary enlarged sectional view taken on the line 11—11 of Fig. 8.

In Figs. 8–11 inclusive a modification of the invention has been disclosed which distinguishes from the prior form in a quick release mechanism for the diaphragm spring load mechanism, controlled by a bleed from the air outlet and arranged to prevent the passage of beer through the device. More specifically, the quick release mechanism includes a slide 50 slidably mounted in an opening in the stem 46'. The spring 45 acts between the cup 44 and the slide 50. The slide 50 is restrained from moving by several levers 51. These levers are pivotally mounted intermediate of their ends by pintles 52. The outer extremities of these levers bear against a diaphragm 53 mounted transversely within the stem 46'. A bleed tube 54 is swively connected with the outer end of the stem 46'. This bleed tube, see Fig. 8, connects with the pipe 14 which is interposed between the air outlet 12 and the T-shaped pipe fitting 15. The stem 46' is provided with radially projecting handles 55 by which it may be manually turned.

The diaphragm 53 is mounted within the stem by brazing or welding. Specifically, the stem is cut in half; the edges of the diaphragm are placed between the adjacent faces of the stem sections, and then the parts are welded together. The end of the bleed pipe 54 which is remote from the stem 46' is normally closed by a one way valve 56. This one way valve is held in a closed position by a very weak spring 57. The valve comprises merely a strip of material pivotally mounted at its rear end by a pintle 58. Its front end 56' is bent outwards. Compressed air passing through the device will pass in the direction of the arrow A and the valve 56 will maintain its closed position.

In the event there is any back pressure and beer, instead of being forced from the faucet 27 back to the beer barrel is forced through the faucet 27 and into the beer return device, the valve 56 will open. The beer will first strike the offset end 56' and so force the valve open. The beer will then flow through the bleed 54 and act against the diaphragm 53, pivoting the levers 51 which then move to release the slide 50. Instantly the spring 45 will be released and lose its tension, since it may now expand. This takes the counteracting balance off the spring loaded valve 33 and the valve is now free to close. This arrests the flow of beer through the valve and out of the air inlet 11.

The levers 51 work within recesses 59 formed in the inner face of the stem 46'. The pintles 52 are supported by lugs 60 mounted within the stem 46'.

While we have illustrated and described the preferred embodiments of our invention, it is to be understood that we do not limit ourselves to the precise constructions herein disclosed and the right is reserved to all changes and modifications coming within the scope of the invention as defined in the appended claims.

Having thus described our invention, what we claim as new, and desire to secure by United States Letter Patent is:

1. A beer return device, comprising a body having an air inlet at one side for connection with a source of compressed air, and an air outlet at another side for connection with a beer faucet, a valve seat for said air inlet positioned to the front of said air outlet, a spring loaded valve on said valve seat, a diaphragm mounted within said body, pins slidably mounted in said body and bearing against said valve to open said valve when moved and said pins also bearing against said diaphragm, said body being formed with a passage extending from said air outlet to the pin side of said diaphragm, an adjustable spring loading mechanism for the other side of said diaphragm, and a quick release mechanism for said diaphragm spring load mechanism controlled by a bleed from said air outlet.

2. A beer return device, comprising a body having an air inlet at one side for connection with a source of compressed air, and an air outlet at another side for connection with a beer faucet, a valve seat for said air inlet positioned to the front of said air outlet, a spring loaded valve on said valve seat, a diaphragm mounted within said body, pins slidably mounted in said body and bearing against said valve to open said valve when moved and said pins also bearing against said diaphragm, said body being formed with a passage extending from said air outlet to the pin side of said diaphragm, an adjustable spring loading mechanism for the other side of said diaphragm, and a quick release mechanism for said diaphragm spring loading mechanism controlled by a bleed from said air outlet, and comprising a bleed connected with said air outlet, a stem for adjusting said load, said stem being provided with a diaphragm, said bleed being connected with a compartment at one side of said first mentioned diaphragm, levers pivotally mounted upon said stem and having one of their ends engaging the other side of the first mentioned diaphragm, a slide held in position by the said levers and releasable upon pivoting of the levers due to motion of said second mentioned diaphragm, and a loading spring interposed between said slide and said first mentioned diaphragm.

3. A beer return device, comprising a body having an air inlet at one side for connection with a source of compressed air, and an air outlet at another side for connection with a beer faucet, a valve seat for said air inlet positioned to the front of said air outlet, a spring loaded valve on said valve seat, a diaphragm mounted within said body, pins slidably mounted in said body and bearing against said valve to open said valve when moved and said pins also bearing against said diaphragm, said body being formed with a passage extending from said air outlet to the pin side of said diaphragm, an adjustable spring loading mechanism for the other side of said diaphragm, and a quick release mechanism for said diaphragm spring loading mechanism controlled by a bleed from said air outlet, and comprising a bleed connected with said air outlet, a stem for adjusting said load, said stem being provided with a diaphragm, said bleed being connected with a compartment at one side of said first mentioned diaphragm, levers pivotally mounted upon said stem and having one of their ends engaging the other side of the first mentioned diaphragm, a slide held in position by the said levers and releasably upon pivoting of the levers due to motion of said second mentioned diaphragm, and a load spring interposed between said slide and said first mentioned diaphragm, said stem being threadedly supported to advance or move backwards to correspondingly move said slide for controlling the tension of said spring.

CHARLES HORANSKY.
FRANK J. SUCHANEK.